United States Patent [19]

Gesta

[11] Patent Number: 5,052,484
[45] Date of Patent: Oct. 1, 1991

[54] ELECTRICAL CONNECTOR AND CONTACT ASSEMBLY FOR VEHICLES

[75] Inventor: Jean-Louis Gesta, Chateaugay, France

[73] Assignee: Compagnie Generale de Establissements Michelin, Clermont-Ferrand, France

[21] Appl. No.: 561,899

[22] Filed: Aug. 2, 1990

[30] Foreign Application Priority Data

Aug. 10, 1989 [FR] France .................. 89 10864

[51] Int. Cl.⁵ ............................................ H01R 29/00
[52] U.S. Cl. .................................. 439/188; 200/51.09
[58] Field of Search .................... 200/51.09, 51 R; 439/10, 16, 20, 27, 34, 35, 188, 289, 592, 824

[56] References Cited

U.S. PATENT DOCUMENTS

| | | | |
|---|---|---|---|
| 1,390,607 | 9/1921 | Farmer | 439/289 |
| 2,824,183 | 2/1958 | Marasco et al. | 200/51.09 |
| 3,577,208 | 5/1971 | Petrick | 200/51.09 X |
| 4,146,286 | 3/1979 | Jones | 439/289 |
| 4,904,213 | 2/1990 | Hock et al. | 439/824 |
| 4,934,954 | 6/1990 | Fransson et al. | 439/188 X |

FOREIGN PATENT DOCUMENTS 1554320  1/1969  France .
2564783  11/1985  France .
2605938  5/1988  France .

*Primary Examiner*—Neil Abrams
*Assistant Examiner*—Khiem Nguyen
*Attorney, Agent, or Firm*—Robert R. Reed

[57] ABSTRACT

An electrical connector device comprises an isolating support 20 and a conductive capsule 21 accessible from the exterior of the connector and fixed to the support 20 by a deformable membrane 22. The support 20, the membrane 22 and the capsule 21 define a cavity 23 at the bottom of which is a pole 24. Without connection to an associated contact, the capsule 21 is isolated from the pole 24. At the time of connection to said associated contact, the associated contact depresses the capsule 21 to establish the electrical contact with the pole 24. In particular, this connector device is useful between vehicle components that require frequent removal and reattachment where electrical signals are transmitted across the interface.

7 Claims, 5 Drawing Sheets 5,052,484

ELECTRICAL CONNECTOR AND CONTACT ASSEMBLY FOR VEHICLES

TECHNICAL FIELD

The present invention relates to electrical connectors. In particular, it concerns a type of electrical connector usable notably in the automobile industry; for example, the electrical connections between wheels at each wheel support.

BACKGROUND OF THE INVENTION

The implantation on vehicular wheels of the electrical components necessary to ensure the surveillance of the tires necessitates the provision for electrical lines traversing from the tire to the vehicle chassis. Whether the connection between the wheel and the vehicle develops through galvanic sliding contact or without galvanic contact, it is necessary to implant on the wheel some electrical wires and sometimes some connectors. Notably, this occurs if the movable antenna is not attached to the wheel, but to the hub or to the brake drum. In this case, it is necessary to implant the electrical connectors between the wheel and the hub or brake drum in order to be able to comfortably separate the wheel from the hub and brake drum at the time of each removal of the wheel.

The problem is in forming an electrical connector which can function with great reliability in a very aggressive environment. It is necessary again that the use of this connector be as simple as possible and that the operations of connection and successive disconnection does not damage it. Lastly, in the case where there are 10 bolts for attaching the disc of the wheel to the hub, there are 10 possible positions for mounting the disc on the hub. Generally, there is no clear choice and the operator mounts the disc randomly, since each position is as good as any other. Therefore, when there is an electrical connection between the wheel disc and the hub, it is advisable to avoid having to regulate the angle of mounting of the wheel on the hub at the time of each mounting, so that the operation of mounting the wheel is not too tedious.

SUMMARY OF THE INVENTION

The electrical connector is to be connected in a permanent manner to a conductive wire in one part, and is to realise from the other part a separable "galvanic" connection with an associated contact. This comprises two conductive stages: (1) the first of the conductive stages is designed as being connected to a conductive wire and is galvanically isolated from the exterior of said connector, (2) the second conductive stage is accessible through the exterior from said connector and is designed to accomplish the said separable galvanic connection. The second conductive stage galvanically isolates the said conductive first stage when the connector and an associated contact are separated. Alternately, they are placed in galvanic contact when the first connector and the associated contact are making contact with each other.

As a result of this invention, which permits placing a conductive capsule (accessible from the exterior of the connector) under voltage only if the connector is joined to its associated contact, it is very easy to multiply connections of this kind on the wheel as well as on the hub or brake drum. One connects the connectors in parallel but only the capsule of the connector which contacts the associated contact, will be placed under voltage. In regard to other connectors, the capsule, which is the sole conducting piece accessible from the exterior, lays isolated galvanically from the circuits electrically connected. Also, moisture cannot provoke any bad functioning by creating a parasitic conductive route towards the grounded mass. Certainly, with the novelty of the connector used, it is very possible to forecast a perfect imperviousness, by providing the necessary means for proper contact.

Moreover, one can conceive of numerous other applications of the connector according to the invention. For example, other engagement devices can be realized for making electrical connections between the truck tractor and trailer, or between trailers. If such a trailer is not used, the connector placed on the tractor may not have contact under voltage. A much greater reliability for the functioning of the electrical equipment of the vehicle results since, in a humid atmosphere, any electrical contact accessible from the exterior may not be under voltage if the electrical connector lays unused. The electrical contact remains under voltage when enclosed in a perfectly impervious surrounding.

These connector devices for the surveillance of vehicles constitutes another example of utility. In general, each time there is a problem of an electrical connector which is susceptible to becoming disconnected in the presence of moisture, the invention can find a judicious application.

The description which follows illustrates only the invention applied to the embodiment of a connector and an associated contact for vehicle wheels. It concerns certainly an example not limiting the scope of the invention. The attached figures illustrate the invention, representing different embodiments and the best mode to understand well all the advantages of the invention.

BEST MODE AND PREFERRED EMBODIMENT

Figure 1:
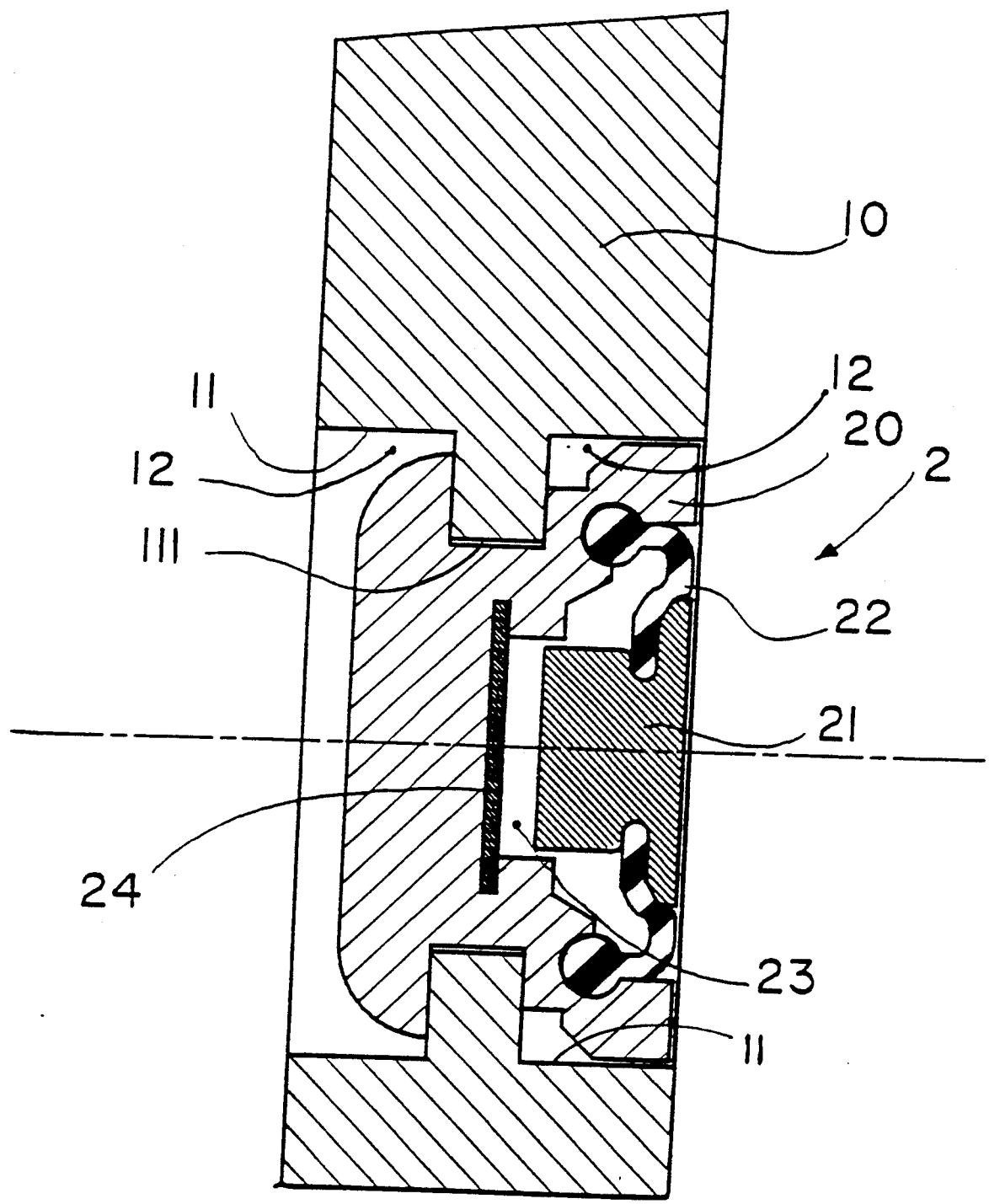
FIG. 1 is a sectional view showing the connector.

FIG. 1, shows part of a disc 10 for heavy truck disc wheels having a bored surface 11 provided on each side 12 by countersinking. The connector 2 comprises an isolating support 20 which is restrained at the interior bored surface 111 of the disc wheel. Certainly, the attachment on the disc wheel does not limit the scope of the invention and can be executed through some other equivalent means. The isolating support 20 of the connector 2 allows a conductive capsule 21 to appear from the exterior of said connector 2, which constitutes the second conductive stage accessible from the exterior of the connector 2. The capsule 21 is fixed on the support 20 through a deformable membrane 22 which is elastic and impervious and made with no preference for conductive material or insulating material. Thus a cavity 23 is defined by the support 20, the capsule 21, and the membrane 22. A pole 24 constitutes the first conductive stage conductor, which is fixed to the support 20 at the bottom of the cavity 23, opposite the capsule 21.

Figure 2:
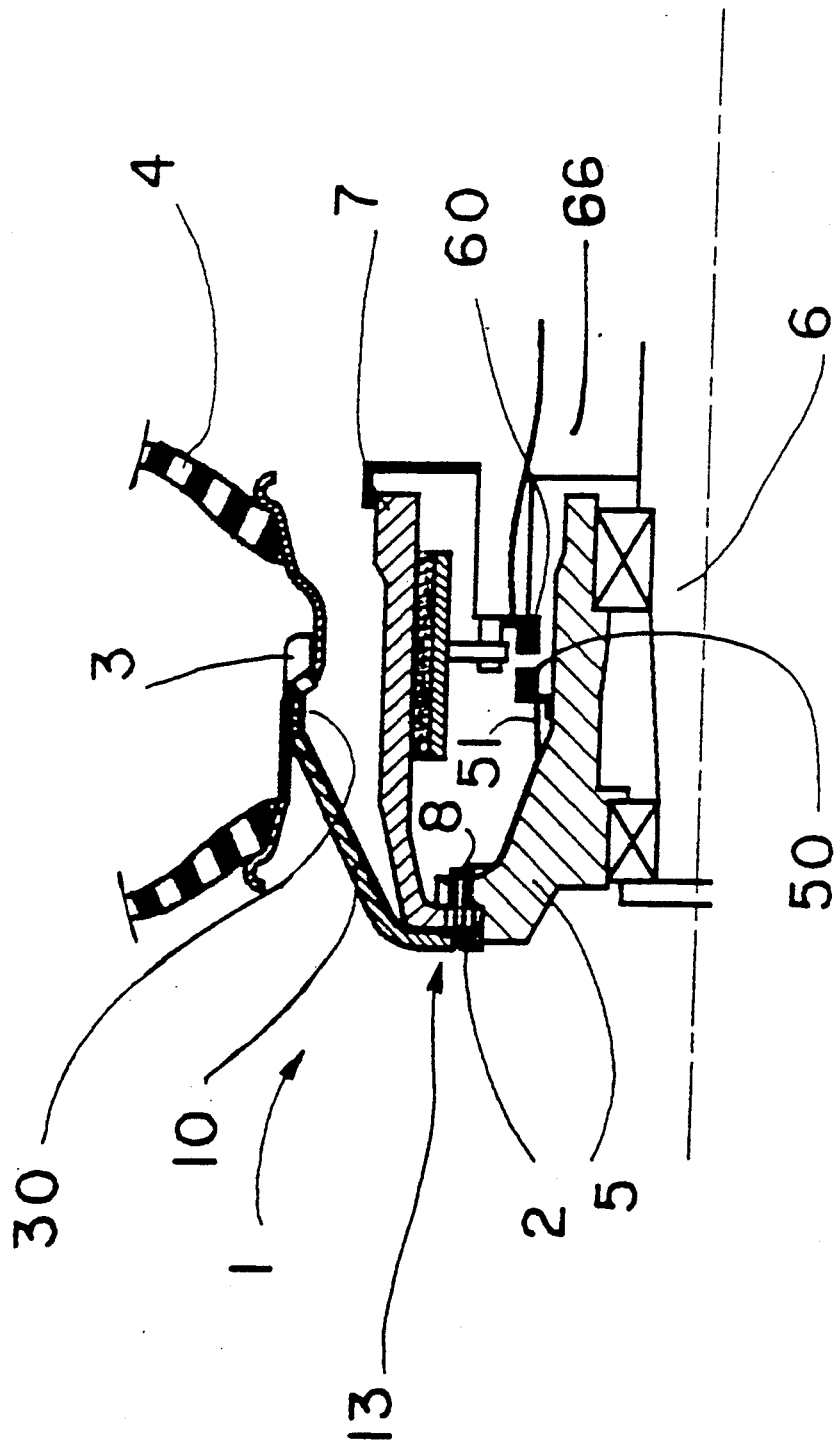
FIG. 2 illustrates the implantation of the invention and the assembled system for the surveillance of a tire.

The implantation on the disc wheel 1 is illustrated in FIG. 2, for mounting on a heavy truck. One can see a device 3 comprising the necessary sensors for collecting information and the necessary circuits for assuring the surveillance of the tire 4. The disc wheel 1 is mounted on a hub 5 fitted on the wheel spindle 6. In the embodiment described, the coupling between the moving entity in rotation (disc wheel 1, its tire 4 and the hub 5) and the chassis of the vehicle (called "fixed space" for distinguishing the moving entity in rotation) is realized through concentric antennas 50 and 60. A rotating antenna 50 is turning and attached to the hub 5. The fixed antenna 60 is attached to the wheel backing plate 66. Also, a brake drum 7 is fixed to the hub 5 and can be attached to either the inside or the outside of said hub 5. The support 20, according to the invention, is implanted in the wall of the disc 10 of the disc wheel 1, and its location is essentially within the implant zone 13 defined by the contact of the disc wheel 1 on the hub 5 and drum 7, and then radially to the interior of the circle formed by the holes for the stud bolts used to attach the disc 10 on the hub 5 and drum 7. An associated contact 8, described in more detail after this, is implanted in the wall of the hub 5 and the brake drum 7. The connector 2 is connected to a conducting wire 30 which is connected to a sensor device 3, and the associated contact 8 is connected to another electrically conducting wire 51 which is connected to the rotating antenna 50.

Figure 3:
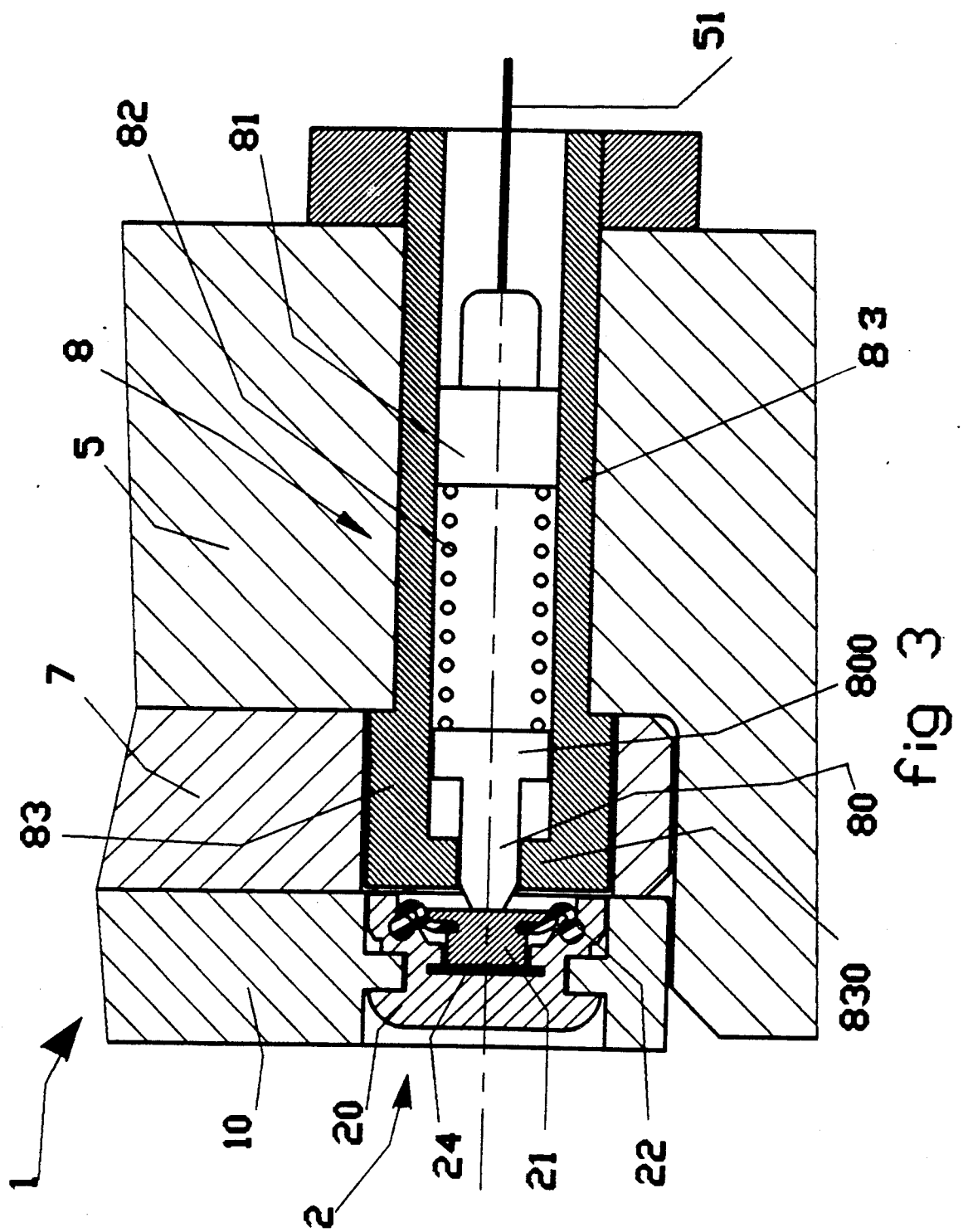
FIG. 3 is a sectional view showing a connector and an associated contact branched to a vehicle surveillance circuit.

In FIG. 3, the assembly comprising a connector 2 and an associated contact 8 is shown in detail. Said associated contact 8 comprises a conductive needle 80 mechanically attached to a conductive support 81 by way of an elastic spring element 82. Said needle 80 and said support 81 being electrically connected and disposed in an isolating chamber 83, outside of which the tip of the needle 80 is projected under the action of the said elastic spring element 82. The conductive needle 80 is properly contoured to be the contacting device when used with the capsule 21 with said needle 80 being attached to the conductive support 81 by way of an elastic spring element 82. The spring element 82 has an electrical function, which is to electrically connect the needle 80 to the support 81, and a mechanical function to confer to the needle 80 a force, oriented parallel to the symmetrical axis of the hub 5 and drum 7, to separate the needle 80 from the support 81. The support 81, the elastic spring 82 and the needle 80 are disposed in an isolating chamber 83 embedded within the brake drum 7 and the hub 5. The second conductive wire 51 is connected to the support 81. The chamber 83 comprises, from the axially exterior side of the brake drum, a flange 830 of the sort which along with the base 800 of the needle 80 limits the movement of said needle 80 toward the exterior.

On the disc 10 of the disc wheel 1, are disposed as many of the connectors 2 as necessary, taking into account the number and the respective position of the stud bolts (not shown) for attaching the disc wheel 1 on the hub 5 and drum 7. Whatever relative position the disc wheel 1 has with respect to the hub 5 and drum 7, one of the connectors 2 can be in contact with the associated contact 8 implanted within the hub 5 and drum 7. The spring 82 is compressed in such a way that the needle 80 forces the capsule 21 towards the pole 24 and establishes an excellent electrical contact between the needle 80 and the capsule 21 and between the capsule 21 and the pole 24. All the connectors 2 implanted on the disc wheel 1 are electrically connected with electrical wires binding all their poles 24, which are consequently all under voltage during the operation of the sensor device 3. On the other hand, all the capsules 21 of the connectors 2 which are not connected to the associated contact 8, rest in the position represented in FIG. 1, and are consequently galvanically isolated.

To ensure as low a resistance to electrical conductivity between connectors and associated contacts as possible, it is desirable that this contact comprise a means to secure a rotational motion of the needle 80, to accompany the translational movement inside said chamber 83, when the projection of the needle 80 makes contact with said connector 2. This permits a cleaning of the conductive surfaces assuring the galvanic contact.

Figure 4:
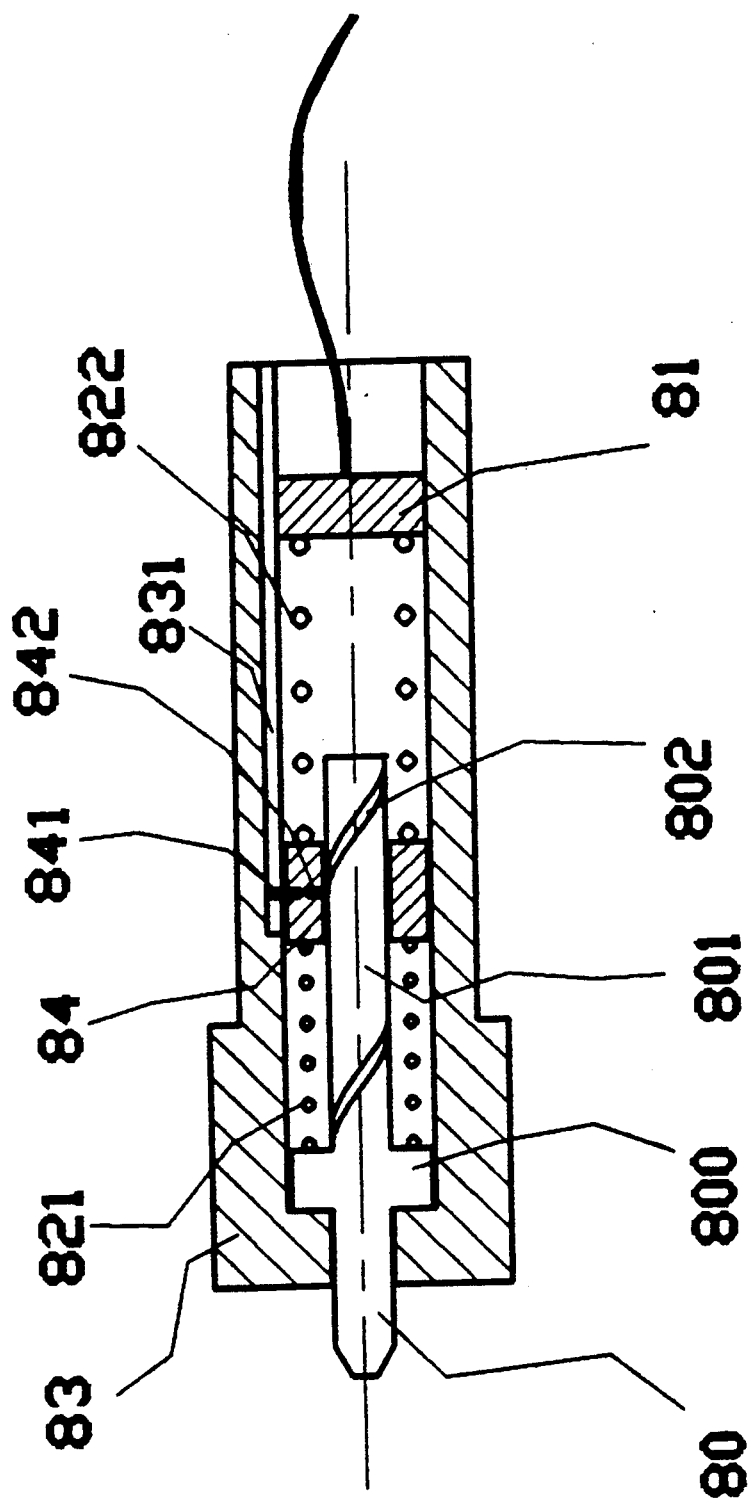
FIG. 4 shows an improvement to the associated contact.

An associated contact comprising such improvement is illustrated in FIG. 4. One can see that the needle 80 has a rod 801 extending it axially inside said chamber 83 from the needle base 800. The rod 801 has a thread 802 at a very open pitch. The isolating chamber 83 has a keyway 831 disposed parallelly to the axis of said chamber 83. A connecting collar 84 comprises a first tab 842 engaging in the thread 802 and a second tab 841 engaging in the keyway 831. A first spring 821 of stiffness K1 is disposed between the base 800 of the needle and the connecting collar 84. A second spring 822 of stiffness K2 clearly higher than K1 is disposed between the connecting collar 84 and the support 81. The galvanic conduction is assured between the needle 80 and the support 81 through an appropriate means. For example, the first and second springs 821 and 822 and the connecting collar are conductors.

When pushing the needle 80 of the associated contact 8 against the connector 2 during mounting of the disc wheel 1, the stiffness K2 of the first spring 822 being much larger than the stiffness K1 of the second spring 821, the connecting collar 84 remains relatively immobile. Consequently, all motion due to penetration of the needle 80 to the interior of the chamber 83 is obligatorially accompanied by a rotation of the needle 80 itself, a rotation which is imposed through the co-operation of the immobile first tab 842 and of the thread 802. When the force developped through the second spring 821 reaches and surpasses that developped through the first spring 822, or when the rotation of the needle 80 itself is prevented (i.e. the friction becoming too large between the capsule 21 and the needle 80) the needle can continue to penetrate to the interior of the chamber 83 by compressing the first spring 822 due to sliding of the connecting collar 84 engaged through the second tab 841 in the keyway 831.

For the mounting of dual tires, a modification on the basic connector is disclosed using the same principle. This permits connections on the two faces of the disc 10 of the disc wheel 1 using the capsules which remain galvanically isolated when not used with the associated contact 8. In this case, the connectors provide a third conductive stage which is similar to the second stage, and also accessible from the exterior.

Figure 5:
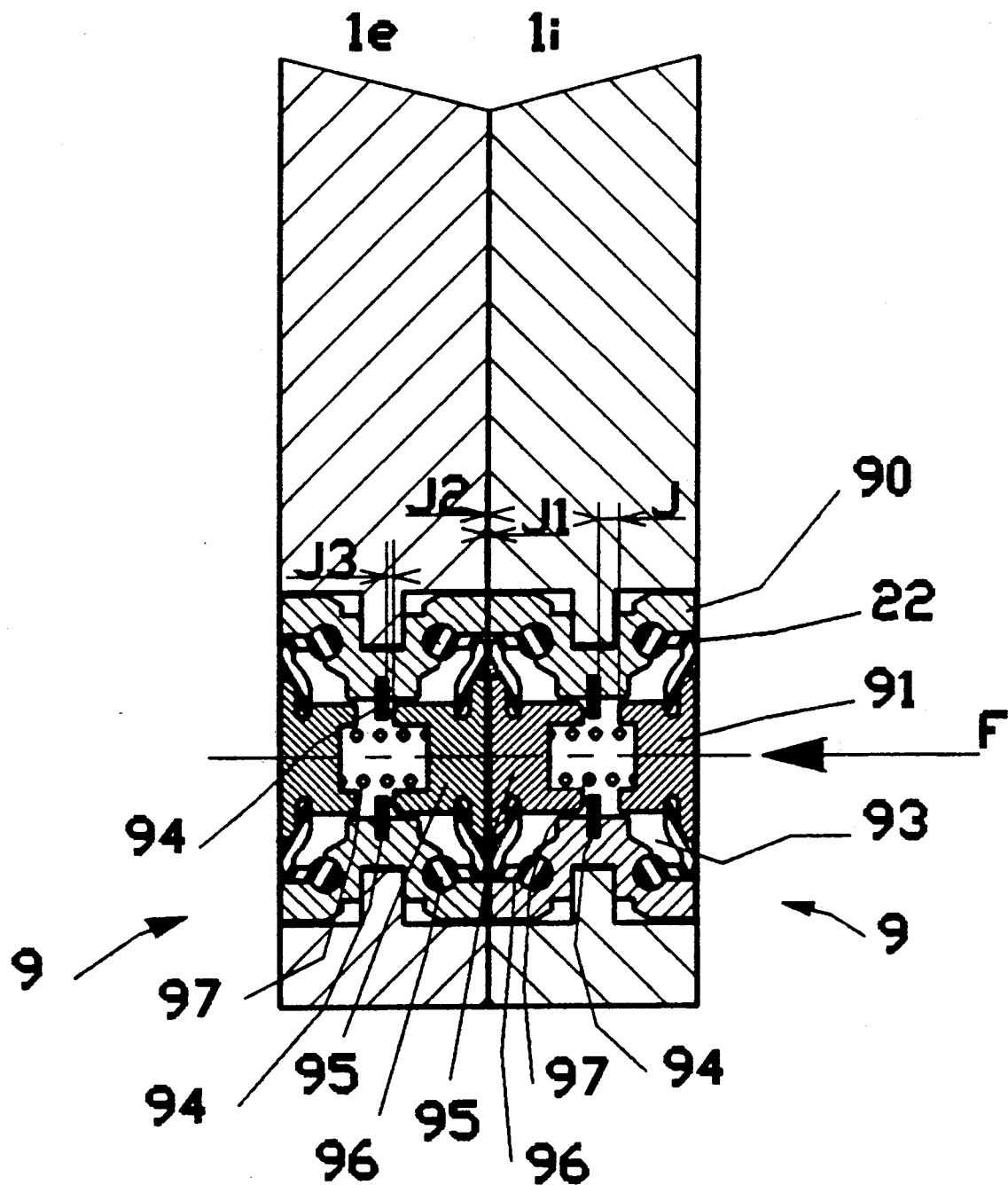
FIG. 5 shows a modification of the connector specifically adapted for dual wheels.

In FIG. 5, note an interior disc wheel 1$i$, that is to come in contact with the hub and drum of the vehicle, and an exterior disc wheel 1$e$. Each of the disc wheels 1$i$ and 1$e$ have identical modified connectors 9. Each modified connector 9 is constituted of a modified isolating support 90 which allows to appear on an exposed face a modified conductive capsule 91 constituting the said conductive second stage conductor. A second capsule 95 is also provided in each disc. Said capsules 91 and 95 are attached to said modified support 90 by means of the deformable membranes 22. Said modified support 90 along with said modified capsule 91, said second capsule 95 and said membranes 22 defines a void 93 in the interior which has a modified pole 94 constituting the said conductive first stage conductor.

For the embodiment illustrated in FIG. 5, the conducting second and third stages are permanently bound electrically one to the other, and, outside of all branching to an associated contact, remain isolated from the first stage conductor. One can see that the modified capsule 91 and second capsule 95 are bound through a capsule spring 97 which ensures the electrical contact between capsules and leads to maintaining them separated one from the other. At the time of contact with an associated contact, a force symbolized by (F) is applied to the modified capsule 91 of the modified connector 9 implanted in the interior disc wheel 1i. The clearances (J1, J2, and J) appearing in FIG. 5 are such that in rest condition (J1+J2) is smaller than (J). The clearance (J1) is the clearance existing between the second capsules 95 of each of the modified connectors 9 after mounting the dual disc wheels, but apart from the action of force F. The clearance (J2) is the clearance existing at the interior of each modified connector 9 between the second capsules 95 and the modified pole 94, and the clearance (J) is that existing at each of the modified connectors 9 between the modified capsule 91 and the modified pole 94 in rest condition. That is to say, clearance (J) is after mounting the dual disc wheels on their hub without the action of an associated contact 8, represented by F in FIG. 5. The force of the associated contact should deform the capsule spring 97 in the interior wheel 1i establishing contact between the modified pole 94 and the modified capsule 91 of the interior disc wheel 1i. Simultaneously, contact also occurs between the said modified capsule 91 of the interior disc wheel 1i and the modified pole 94 of the exterior wheel by recoil action of the second capsules 95 through the galvanic contact between said modified capsule 91 and capsule spring 97, between capsule spring 97 and second capsule 95 of interior disc wheel 1i, between the two second capsules 95 and between second capsule 95 of the exterior disc wheel 1e and the modified pole 94 of the exterior disc wheel 1e.

Such a connector assembly can become independant of the manufacturing tolerances and of mounting of the wheels, and still ensure an excellent electrical contact and an automatic electrical connection. The discrimination between the exterior wheel and the interior wheel can be assured through the electronics of the sensor system for the tires. Someone skilled in the art can very easily determine the clearances, the stiffness of the springs and membranes, and eventually forecast some stops for limiting certain movements of capsules to insure discrimination between the exterior disc wheel 1e and interior disc wheel 1i. It is also possible to replace the connection between the modified capsule 91 and the second capsule 95 by an elastically deformable pushbutton which allows them to be galvanically isolated one from the other apart of any connection. In addition, a means is possible to ensure the contact between the modified capsule 91 and the second capsule 95 of the interior disc wheel 1i after contact with said associated contact, but, to permit isolation one from another these same capsules in the exterior disc wheel 1e while assuring the contact with the correct modified pole 94.

After connecting wires and circuits it is necessary to use an insulating cover (not shown) for covering the modified capsule 91 of the exterior disc wheel 1e, since this is necessary at least for the connector used. Or, it is possible to utilize for the exterior disc wheel 1e a connector of the type illustrated in FIG. 1 and to easily orient the only conducting capsule 21 accessible from the exterior. Still another possibility, the modified connector 9 can be conceived in a manner to allow the modified capsule 91 to remain always isolated.

Numerous variants, adaptations, or applications of the invention can be reduced to practice by the disclosure of this invention without leaving the scope of the invention; particularly whenever several conductive stages are clearly visualized. Notably, it is entirely possible that the pieces assuring the properly fixed electrical connections are realized under the form of male and female plugs. This characteristic visualization being certainly compatible with the present invention.

What is claimed is:

1. A connecting device having at least two electrical connectors designed to be permanently connected in parallel with a conductive wire from one part and from another part to realize a separable galvanic connection with one associated contact, each of said electrical connectors comprising a support on which are mounted two conductive stages:
   a) the first conductive state having electrical connecting means to be connected to said conductive wire, and being galvanically insulated from the exterior;
   b) the second conductive stage being accessible from the exterior of said connector to be able to be pressed by said associated contact, being in a rest position galvanically isolated from said first conductive stage, and being movable in said support, to be pressed against said first conductive stage when pressed toward the inside of the contact in order that the two conductive stages are put in galvanic contact when said connector is in operation with said associated contact.

2. The device according to claim 1, comprising an isolating support that allows containment of a conductive capsule by a deformable membrane, said conductive capsule being a part of the said second conductive stage accessible from the exterior, whereby said conductive capsule is attached to said isolating support by said deformable membrane which is elastic and impervious, wherein said isolating support along with said conductive capsule and said deformable membrane define a cavity wherein a pole is fixed opposite to said conductive capsule, said pole forming the said first conductive stage conductor.

3. The device according to claim 1, further characterized in that it comprises a third conductive stage being accessible from the exterior, movable in said support either to be pressed against said first conductive stage when pressed toward the inside of the contact, or to be moved in protrusion to the outside of the contact by the second conductive stage when the latter is pressed toward the inside of the contact.

4. The device according to claim 3 comprising a modified isolating support that allows containment of a modified conductive capsule on the exterior face by said deformable membrane, said modified capsule being a part of said conductive second stage, and further comprising on the opposite face a second conductive capsule also contained by said deformable membrane and thereby constituting the said third conductive stage conductor, said deformable membrane being elastic and impervious, wherein said deformable membrane, said modified isolating support and said modified capsule and second conductive capsule define a cavity including a modified pole.

5. The device according to claim 4, wherein said modified conductive capsule and said second conductive capsule are connected through a capsule spring which is conductive and ensures galvanic contact between these capsules, and separates them one from the other.

6. An assembly of a connector and one associated contact, comprising said connector designed to be permanently connected to a conductive wire from a first part and from a second part to realize a separate galvanic connection with said associated contact being accessible from the exterior of said connector and being movable and able to be pressed by said associated contact to make contact with said first part, whereas said associated contact comprises a conductive needle bound mechanically to a conductive support by an elastic spring element, said conductive needle and said conductive support being bound electrically and disposed in an isolating chamber outside of which the tip of said connector needle projects from said isolating chamber under the action of said elastic spring element and maintains electrical contact with said second part of said connector during normal operation.

7. The assembly according to claim 6, wherein said conductive needle is characterized in that it comprises a means for ensuring a rotational movement of the needle accompanying the translational movement when the tip of the conductive needle makes contact with said connector or said modified connector.

* * * * *